United States Patent [19]
Walton

[11] Patent Number: 5,882,170
[45] Date of Patent: Mar. 16, 1999

[54] WATERCRAFT LOADING AND LAUNCHING APPARATUS

[76] Inventor: Peter Walton, 312 Rte. 27, Apt. 314, Raymond, N.H. 03077

[21] Appl. No.: 62,755

[22] Filed: Apr. 17, 1998

[51] Int. Cl.⁶ .................................................. B60P 9/00
[52] U.S. Cl. ........................... 414/462; 224/402; 224/403
[58] Field of Search ................... 44/462; 224/402, 224/403, 405, 509, 519, 521; 296/26

[56] References Cited

U.S. PATENT DOCUMENTS

| | | | |
|---|---|---|---|
| 3,885,689 | 5/1975 | Grove et al. | 414/462 |
| 4,212,580 | 7/1980 | Fluck . | |
| 4,960,356 | 10/1990 | Wrenn . | |
| 5,354,164 | 10/1994 | Goss et al. . | |
| 5,451,088 | 9/1995 | Broad . | |
| 5,458,389 | 10/1995 | Young | 296/26 |
| 5,492,454 | 2/1996 | Coyler | 414/462 |
| 5,542,810 | 8/1996 | Florus . | |
| 5,603,600 | 2/1997 | Egan et al. | 414/462 |
| 5,615,813 | 4/1997 | Ouellette . | |
| 5,752,636 | 5/1998 | Manley | 414/462 |

*Primary Examiner*—Karen M. Young
*Assistant Examiner*—Gregory A. Morse
*Attorney, Agent, or Firm*—Mesmer Law Offices, PA.; Robert R. Deleault

[57] ABSTRACT

A watercraft loading and launching apparatus for a pickup truck having a trailer hitch receiver. The apparatus has an elongated receiver bar with one end adapted to fit a trailer hitch receiver and a cross member support bar secured to the other end. The cross member support bar may be straight or angled for supporting watercraft having a V-bottom, a semi-V bottom, a flat bottom, or equipped with pontoons. There is disclosed a second embodiment wherein the cross member support bar has hinged extensions for allowing use with both V-bottomed and flat-bottomed watercraft. The apparatus may also include a cradle assembly for supporting the watercraft within the cargo bed of the pickup truck.

23 Claims, 5 Drawing Sheets

WATERCRAFT LOADING AND LAUNCHING APPARATUS

BACKGROUND OF THE INVENTION

1. Field of the Invention

The present invention relates to the field of watercraft loading and launching apparatus. Particularly, the present invention relates to a watercraft loading and launching apparatus that is adapted for attaching to a trailer hitch receiver. More particularly, the present invention relates to a watercraft loading and launching apparatus that is adapted for attaching to a trailer hitch receiver on a pickup truck. Even more particularly, the present invention relates to a watercraft loading and launching apparatus that includes a supporting device adapted for attaching to a trailer hitch receiver on a pickup truck and a cradle assembly placed within the bed of the pickup truck.

2. Description of the Prior Art

Boats and other watercraft are generally transported on trailers. Trailers usually fit at least one watercraft and attach to any type of vehicle. Many watercraft owners already have a pickup truck or truck which is able to transport goods in the cargo bed. Generally, these people prefer using the bed of the pickup truck for carrying and transporting their small watercraft. They do not feel that it is desirable to transport their small watercraft on trailers towed behind their pickup trucks. Using the cargo bed of a truck has the advantage of not requiring storage of a trailer. Also, there are the added advantages of no trailer registration, no trailer insurance and no trailer maintenance. Further, it also reduces the difficulty with which to handle the truck because of the maneuverability of the trailer behind the truck.

Most small watercraft are sufficiently heavy and cumbersome to make loading and unloading without two or more people difficult. Even so, while such small watercraft may be lifted by several men into the cargo bed of a pickup truck for transport, it is not easy. Particularly, one or two men are unable to perform such a loading operation with ease and with sufficient care to prevent damage to the boat being loaded. Consequently, recreational vehicles of this type are often loaded on and unloaded from a trailer which is backed into the water, typically on a ramp.

Several devices have been created for carrying boats, recreational vehicles, and other types of watercraft in the bed of a truck. There are other devices that have been created to support loads such as lumber beyond the end of the pickup truck bed thus allowing the truck to carry longer loads than would normally fit in the cargo bed.

U.S. Pat. No. 5,542,810 (1996, H. Cameron Florus) discloses an easily removable dual purpose apparatus for safely transporting personal watercraft in a truck bed. The rack includes a tubular frame with legs for supporting the rack within the truck bed. The personal watercraft is supported by two spaced parallel tubes of the frame. The apparatus further includes removable ramp pieces with expanded ends and a low friction covering for connecting to two larger pieces of tubing which are bent to a 45 degree angle. The two larger pieces are then connected to the end of the rack. The ramp pieces serve as a means for loading the personal watercraft onto the rack in the cargo bed of the truck.

U.S. Pat. No. 5,354,164 (1994, S. A. Goss et al.) discloses a boat launching apparatus for pickup trucks which includes a trailer framework unit pivotally attached on the rear bumper of the truck. The apparatus also has an automatic control for raising and lowering the trailer framework unit relative to the bed of the truck.

U.S. Pat. No. 4,960,356 (1990, B. E. Wrenn) discloses an apparatus for loading, unloading and storing a jet-propelled water vehicle. The apparatus comprise a first pair of tubes made of relatively smooth-surfaced plastic plumbing pipe or the like, a second pair of tubes of similar construction which telescopes within and extends from the first pair of tubes, and devices to adjustably support and space the first pair of tubes on a truck bed.

U.S. Pat. No. 4,212,580 (1980, R. O. Fluck) discloses a loading and support rack for support from the rear of a pickup truck load bed and with the rack overlying and extending forwardly of the tailgate of the pickup truck when the tailgate is in a horizontal position. A horizontal transverse winch mounting structure is provided for support from the upper marginal edge portion of the forward wall of the truck bed. An elongated support frame is also provided and includes a front and rear ends, slightly dependingly supported opposite side forward support wheels and a center rear roller as well as opposite side rollers spaced centrally intermediate the opposite ends of the frame. The winch cable is attached to the boat and the boat as well as the boat supporting frame is pulled up onto and in the load bed of the pickup truck.

U.S. Pat. No. 5,615,813 (1997, P. G. Ouellette) discloses a vehicle long-load stabilizer. The apparatus is attachable to a vehicle's standard tube type trailer hitch using a clevis pin. The apparatus consists of a horizontal member, a vertically angled member, and a horizontal stabilizing member. The apparatus allows longer loads to be carried and disassembles for convenient transport and storage within the vehicle when not in use.

U.S. Pat. No. 5,451,088 (1995, R. L. Broad) discloses a combination frame-supported box receiver and self-stabilizing bed extension. The extension apparatus includes two pieces for providing a two-axis, cantilevered extension for a pickup truck. One piece is a longitudinal-running box beam welded at an upward cantilever angle to a short stub section. The second piece is T-shaped when viewed from above and it includes a single adjustment telescoping transition beam which serves as the transition from the longitudinal box beam to the load-supporting cross beam that is transversely oriented relative to the longitudinal beam.

Therefore what is needed is a watercraft loading and launching device that allows one person to easily load and unload a watercraft onto and from the cargo bed of a pickup truck. What is further needed is a watercraft loading and launching device that can be removably attached to the trailer hitch receiver on a pickup truck. What is still further needed is a watercraft loading and launching device that can be removed and easily stored within the cargo bed of the pickup truck. What is further needed is a watercraft loading and launching device that can be used with watercraft having various shaped bottoms such as V-bottom, semi V-bottom, flat bottom, pontoon-shaped bottom and the like. What is also needed is a watercraft loading and launching device that has a separate cradle assembly for supporting the watercraft within the cargo bed of a pickup truck that prevents damage to the watercraft and the truck during loading, unloading and transporting the watercraft.

SUMMARY OF THE INVENTION

It is an object of the present invention to provide a watercraft loading and launching device that allows one person to easily load and unload a watercraft onto and from the cargo bed of a pickup truck. It is a further object of the present invention to provide a watercraft loading and launching device that can be removably attached to the trailer hitch receiver of a pickup truck. It is still a further object of the present invention to provide a watercraft loading and launching device that can be removed and easily stored within the cargo bed of the pickup truck. It is an object of the present invention to provide a watercraft loading and launching device that can be used with watercraft having various shaped bottoms such as V-bottom, semi V-bottom, flat bottom, pontoon-shaped bottom, and the like. It is a further object of the present invention to provide a separate cradle assembly for supporting the watercraft within the cargo bed of a pickup truck that prevents damage to the watercraft and the truck during loading, unloading and transporting the watercraft.

The present invention achieves these and other objectives by providing various structural features that make loading and unloading small watercraft into the cargo bed of a pickup truck easily accomplished by one person. The trailer hitch support of the present invention has a elongated member, also called a trailer hitch receiver bar, which fits into standard trailer hitch receivers found on many pickup trucks or that are available for pickup trucks. There is a cross member support bar transversely attached to the end of the receiver bar opposite the one that slides into the trailer hitch receiver. This support bar may be welded, bolted or riveted to the receiver bar or fastened by any means that securely joins the support bar to the receiver bar. The support bar is joined to the receiver bar at approximately the support bar's midpoint. If viewed from above, the unit would appear T-shaped. For larger trucks, a vertical support bar may be attached between the cross member support bar and the receiver bar. Because of the drop between the hitch receiver and the bed of larger trucks, the vertical support bar would raise the cross member support bar approximately 6–8 inches allowing for loading a watercraft at a smaller angle to the cargo bed than would otherwise be required.

The support bar may be a single unit, or multiple units. For instance, the support bar may be a two piece unit where one end of each unit is fastened to the receiver bar. To allow a watercraft bottom to easily slide across the support bar, the support bar may be covered with a low resistance material. In the alternative, the present invention may have at least one support unit which, itself, may be made from a low resistance material, may have a low resistance material covering or a roller device.

The support bar may be straight or angled. If angled, the support bar would have an obtuse angle with its vertex located at the junction of the support bar and the receiver bar. The preferred angle is one which best supports the various V-bottom and semi V-bottom watercraft, yet would still be useable for other various watercraft bottom configurations. This angled support bar may also have the low resistance covering describe above, or at least two support units. Each support unit may be made from a low resistance material, may have a low resistance covering or a roller device. The roller device may be those typically used on boat trailers or conveyor devices. The angled support bar may be a single piece bent in the proper location at the proper angle or it can be multiple pieces secured to the receiver bar in the proper location and forming the proper angle.

In addition to the support bar being angled, the support bar may be hinged at a predetermined location along the support bar and away from the receiver bar. In this embodiment, the support bar would have an end section that would allow the user to change the angled support bar into a support bar capable of use with a flat-bottomed watercraft, one that uses pontoons or any watercraft bottom where the use of the angled support bar would be inappropriate. The hingable support bar further includes a locking mechanism that locks the hinged end into position when the angled support bar is in the full V-shaped position. The hinged end would also have either the low resistance covering or a roller unit, or a support unit made from a low resistance material allowing for easy movement of the watercraft across the support bar.

The straight support bar embodiment of the present invention may also have the low resistance covering or the support unit which may be made from a low resistance material, or which would have the low resistance covering or the roller device. The straight support bar embodiment would be especially useful with flat-bottomed watercraft.

Another aspect of the present invention is the cradle assembly. The cradle assembly is a separate unit from the trailer hitch support but may be used in conjunction with it to make loading and unloading easier to do. The cradle assembly is placed inside the cargo bed of the pickup truck. It is used to support the watercraft when the watercraft is in the bed of the truck. This would prevent damage such as scratches to the truck bed and the watercraft. The cradle assembly would also hold the watercraft more securely, especially watercraft with V-bottoms or semi V-bottoms. The cradle assembly would prevent these types of watercraft from rocking from side-to-side in the cargo bed as the truck turned around corners.

The cradle assembly has two parallel rails that are spaced to support the bottom of the watercraft. The rails may be covered with a low resistance material or coating, or the rails may have additional watercraft support units similar to those used on the trailer hitch support. These supports may be coated or covered with a low resistance covering, or each support may have at least one roller. It is also possible to use a combination of roller and low resistance covering to accomplish the requirement that the cradle assembly allows the watercraft to slide easily when loading onto or unloading from the bed of the pickup truck. The cradle assembly may also include an upright post at one end, the end closest to the cab of the pickup truck. The upright post may have a watercraft bow receiver unit, a winch or both.

In use, the user would insert the receiver bar end of the trailer hitch support into the trailer hitch receiver on the pickup truck. Receiver bars for these types of trailer hitches are generally secured using a clevis pin. Once secured in the trailer hitch receiver, the user would lift the watercraft, preferably the bow, and place it onto the support bar of the trailer hitch support. The user would then lift the opposite end of the watercraft while pushing the water craft up and across the trailer hitch support and into the cargo bed of the pickup truck. The use of a low resistance covering or roller on the support bar will allow the watercraft to easily slide across the support bar with little effort by the user. Once the watercraft is secured in the cargo bed, the present invention may be left in position during transportation or it may be removed and stored within the cargo bed area of the pickup truck for later use when unloading the watercraft. To unload the water craft, the watercraft would be withdrawn from the cargo bed in reverse order of loading. The end of the watercraft closest to the back of the pickup truck would be pulled until it could be placed on the support bar of the present invention. Conversely, the end of the watercraft that is closest to the cab of the truck may be pushed until the opposite end of the watercraft can be rested on the support bar. The remaining procedure for removal of the watercraft would be to slide the entire watercraft across the support bar in a fashion similar to when using a trailer.

Additional advantages and embodiments of the present invention will be set forth in part in the detailed description which follows, and in part will be apparent from the description, or may be learned by practice of the invention. It is understood that the foregoing general description and the following detailed description are exemplary and explanatory and are intended to provide further explanation of the invention as claimed.

DETAILED DESCRIPTION OF THE PREFERRED EMBODIMENT

Figure 1:
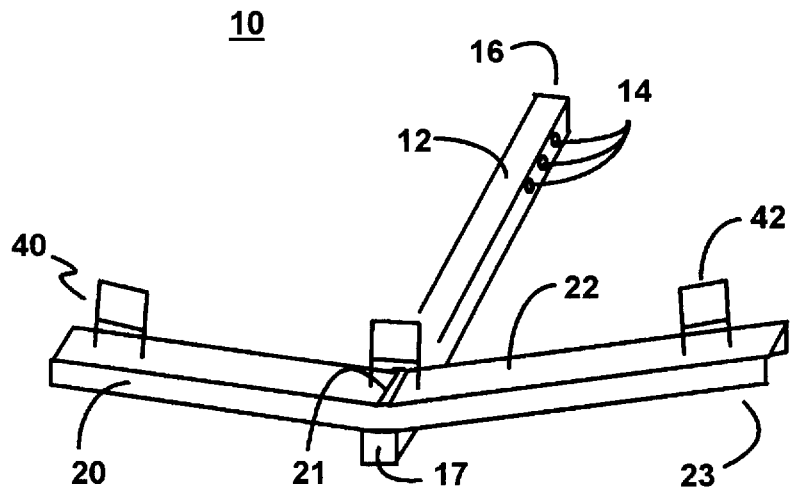
FIG. 1 is a perspective view of the present invention showing the receiver bar, the angled cross member support bar and the support units of the trailer hitch support.

The preferred embodiment of the present invention is illustrated in FIGS. 1–10. FIG. 1 shows a trailer hitch watercraft support 10 having an elongated receiver member 12 and an angled cross member support bar 20. The receiver member 12 has a first receiver end 16 and a second receiver end 17. A plurality of clevis pin locking holes 14 are located in spaced relationship to each other and spaced from first receiver end 16. The plurality of pin locking holes 14 are spaced to allow adjustment of trailer hitch support 10 for proper positioning of support bar 20 relative to the open end of the pickup truck cargo bed.

Support bar 20 has a midpoint 21, a top side 22 and a bottom side 23. Support bar 20 is transversely secured at approximately its midpoint 21 to the second receiver end 17. Support bar 20 may be welded to second receiver end 17, or it may be secured by any fastening device such as bolts, rivets, U-clamps and the like. A low resistance coating may be applied to top side 22 to reduce the friction between the bottom of a watercraft and top side 22 and to aid the user when pushing a watercraft across support bar 20. The low resistance coating may be a chemical coating, a low friction plastic such as Teflon or other type of low friction material.

In the alternative, support bar 20 may be completely wrapped with a low resistance (low coefficient of friction) covering. Support bar 20 may further include at least one support unit 40 secured to top side 22. Support unit 40 may be made from a low resistance material such as Teflon®, or it may also have the low resistance (low coefficient of friction) coating or covering described above, or it may have a roller device 42.

Figure 2:
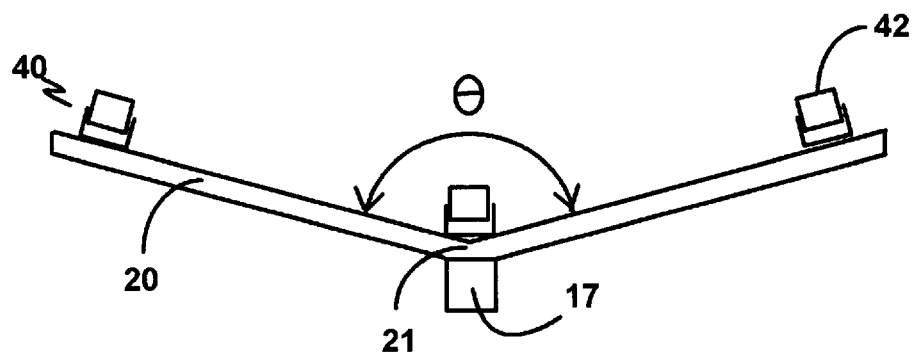
FIG. 2 is an end view of the trailer hitch support showing the angle formed by the support bar.

FIG. 2 shows an end view of trailer hitch support 10. Support bar 20 is bent at approximately midpoint 21 to form an angle θ. Angle θ is an obtuse angle and is preferably of a size that will be useful for loading and unloading most V-bottomed and semi V-bottomed watercraft into and out of the cargo bed of a pickup truck. An acceptably useful angle of 160° for angle θ may be used. It is understood that support bar 20 with angle θ may also be formed from two pieces joined together at midpoint 21.

Figure 3:
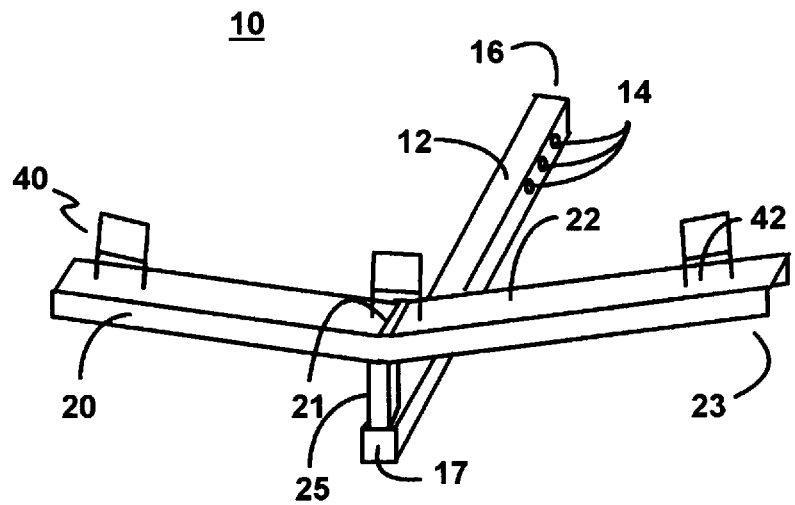
FIG. 3 is a perspective view of the present invention showing the receiver bar, the vertical support bar, the angled cross member support bar and the support units of the trailer hitch support.
Figure 4:
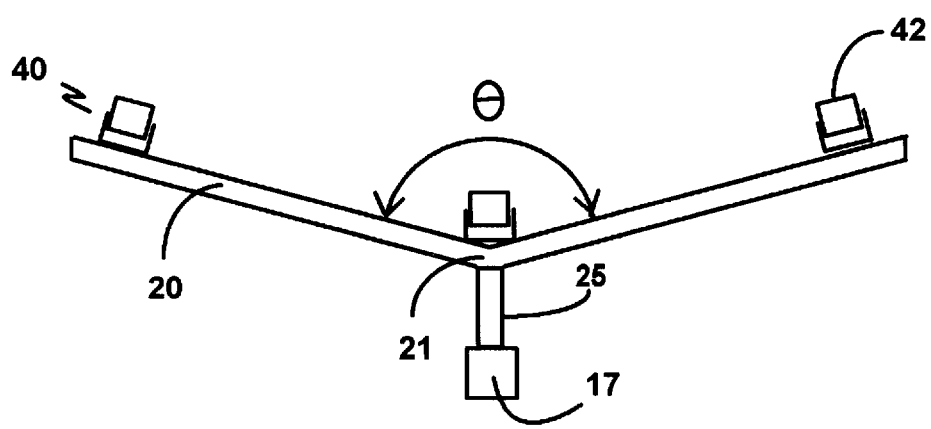
FIG. 4 is an end view of the trailer hitch support showing the angle formed by the support bar and the vertical support bar.

FIG. 3 shows a second embodiment of the trailer hitch support 10. This embodiment is similar to the embodiment shown in FIG. 1, but with the addition of a vertical support bar 25. Larger pickup trucks generally have cargo beds that are vertically higher from the ground and from the hitch receiver than smaller pickup trucks. The vertical support bar 25 may be added between receiver member 12 and angled cross member support bar 20 at midpoint 21 of cross member support bar 20. The length of vertical support bar 25 is preferably about 6 inches. Even with the use of vertical support bar 25, cross member support bar 20 is still positioned below and lower than the cargo bed of the pickup truck. This allows for loading the watercraft with less vertical tilt, that is the loading angle of the watercraft between the water surface and the bed of the cargo truck is lower than it otherwise would be. FIG. 4 shows an end view of the vertical support bar 25.

Figure 5:
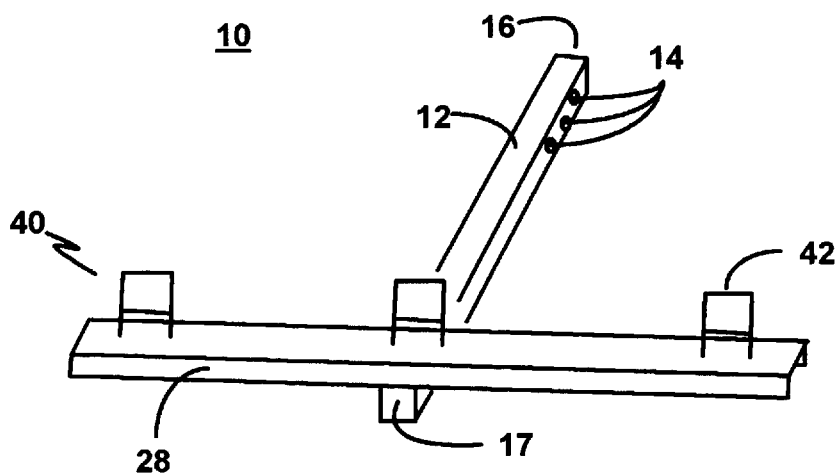
FIG. 5 is a perspective view of the present invention showing the receiver bar, the straight cross member support bar and the support units of the trailer hitch support.
Figure 6:
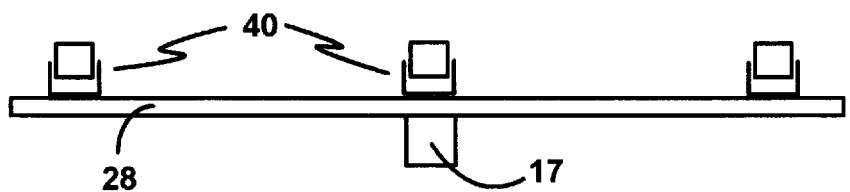
FIG. 6 is an end view of the trailer hitch support showing a horizontal support bar.

FIG. 5 shows a second embodiment of trailer hitch support 10. In this embodiment, trailer hitch support 10 has elongated receiver member 12 with first receiver end 16, second receiver end 17 and the plurality of spaced holes 14 in spaced relationship from receiver end 16. Trailer hitch support 10 further includes a straight cross member support bar 28 which is secured at its midpoint to second receiver end 17. Any fastening means, that is strong enough to withstand the loading and weight pressures normally experienced by trailer hitch support 10 during use, may be used to secure support bar 28 to second receiver end 17. Although trailer hitch support 10 having support bar 28 may be used with V-bottomed watercraft, it is preferable for use with flat-bottomed or pontooned watercraft. FIG. 6 shows an end view of the second embodiment of trailer hitch support 10.

Figure 7:
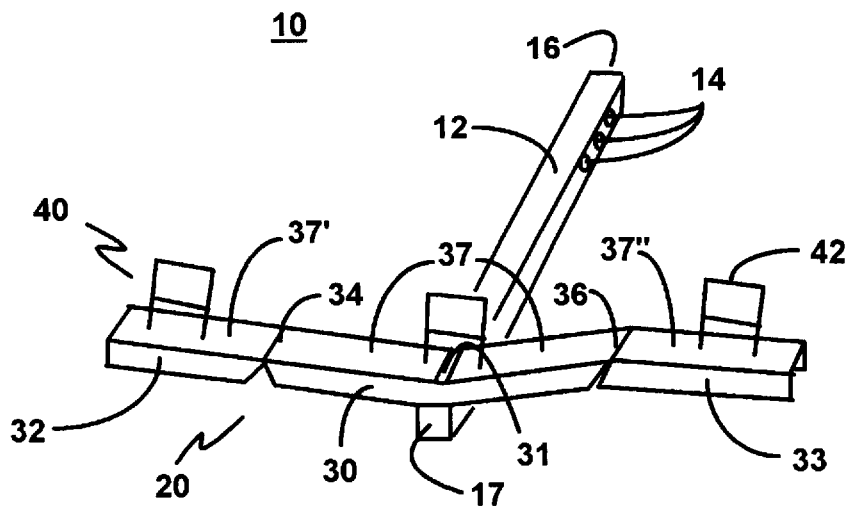
FIG. 7 is a perspective view of a second embodiment of the present invention showing a hingedly angled support bar with one end in a locked position forming one leg of a V and the second end in an unlocked position.

FIG. 7 shows a second embodiment of angled cross member support bar 20. In this embodiment as with the previous embodiments, trailer hitch support 10 has elongated receiver member 12 with first receiver end 16, second receiver end 17 and the plurality of spaced holes 14 in spaced relationship from receiver end 16. Trailer hitch support 10 further includes an angled cross member support bar 20 having an angle θ. Support bar 20 further includes a main support bar section 30 with angle θ, a first main extension 32 and a second main extension 33. Main support bar section 30 may be made of two similar pieces joined together at midpoint 31 with the proper angle θ.

Main support section 30 has a first support section end 34 and a second support section end 36. First main extension 32 is hingedly connected to main support bar section 30 at first support section end 34. Second main extension 33 is hingedly connected to main support bar section 30 at second support section end 36. Main support section 30 is bent at a midpoint 31 and is secured to second receiver end 17 at approximately midpoint 31. Main support section 30, first main extension 32 and second main extension 33 may have a low resistance (low coefficient of friction) coating or cover as previously described. In the alternative, main support section 30, first main extension 32 and second main extension 33 may have one or more of support unit 40 attached to top side 37, 37' and 37", respectively. Support unit 40 may be made from a low resistance material, or it may be coated or covered with a low resistance layer or support unit 40 may have a roller device 42.

Figure 8:
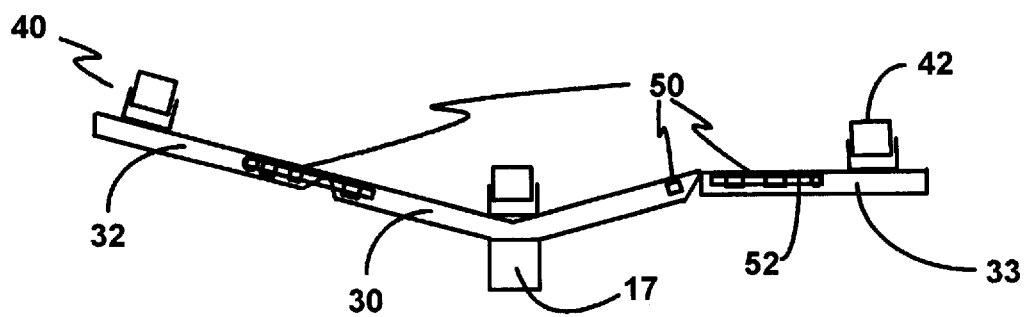
FIG. 8 is an end view of the second embodiment of the present invention showing a hingedly angled support bar.

First main extension 32 and second main extension 33 may be aligned with main support section 30 to form a V-shaped trailer hitch support 10 as shown in FIG. 1 for use with V-bottomed and semi V-bottomed watercraft. To maintain this V shape, a locking mechanism 50 is used. Locking mechanism 50 may be a simple locking slide bar 52 as shown in FIG. 8, or it may be any mechanism that will securely hold first main extension 32 and second main extension 33 in proper alignment with main support section 30.

First main extension 32 and second main extension 33 may be lowered to a horizontal position for supporting watercraft having pontoons or a flat bottom by disengaging locking mechanism 50. FIG. 8 shows an end view of trailer hitch support 20 with first main extension 32 in an aligned position with main support section 30 where locking mechanism 50 is in a locking position. Also shown is second main extension 33 in a horizontal position where locking mechanism 50 is disengaged from alignment with main support section 30. It will be understood by those skilled in the art that locking mechanism 50 is merely illustrative and that any mechanism that will accomplish the same function may be used, all as is well known.

Figure 9:
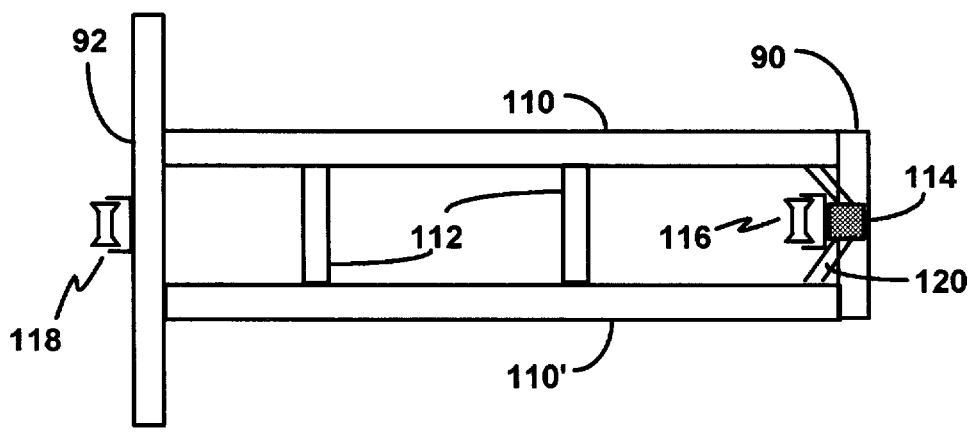
FIG. 9 is a top view of the cradle assembly of the present invention.

FIG. 9 shows a top view of cradle assembly 100. Cradle assembly 100 is generally placed in the cargo bed of a pickup truck. Cradle assembly 100 has two parallel rails 110 and 110' held in a spaced relationship to each other by at least one cross brace 112. A first cradle assembly end 90 incorporates an upright post 114 to which is attached a watercraft bow receiver unit 116. The upright post 114 may also have a winch 122 for winching up a watercraft using a rope or cable. There is also shown a pair of post supports 120.

Figure 10:
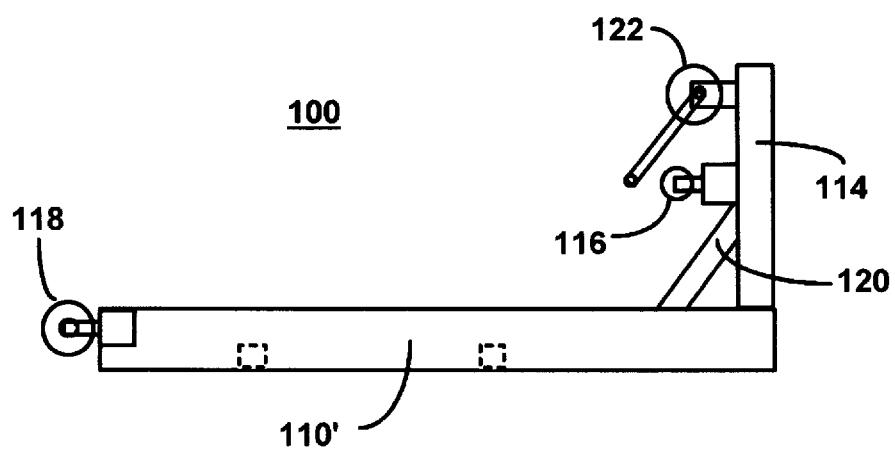
FIG. 10 is a side view of the cradle assembly of the present invention.

A second cradle assembly end 92 has a second end cross brace 93. Second end cross brace 93 may be the same length as cross brace 112 or it may be longer as shown. The length of second end cross brace 93 is preferably the width of the cargo bed of a pickup truck. A known advantage of using this particular length is that second end cross brace 93 will act as a stop for cradle assembly 100. This is achieved by second end cross brace 93 engaging the tailgate end of the pickup truck cargo bed where the tailgate attaches to the cargo bed side walls, thus preventing the cradle assembly 100 from sliding out the open end of the cargo bed. Second cradle assembly end 92 incorporates a cradle assembly support unit 118 which is similar to support unit 40 in FIG. 1. Cradle assembly support unit 118 may be made from a low resistance material, or it may have low resistance coating or covering described above, or it may have a roller device similar to roller device 42. FIG. 10 shows a side view of cradle assembly 100.

To use the present invention, a person would insert the first receiver end 16 of elongated receiver member 12 of watercraft support 10 into the trailer hitch receiver on a pickup truck. The receiver member 12 is then secured in place by aligning one of the plurality of clevis pin locking holes 14 with the a hole in the side of the trailer hitch receiver. A clevis pin is then passed though the aligned holes and secured. This prevents the watercraft support 10 from sliding out of the trailer hitch receiver during use. If cradle assembly 100 is not used, then the user would lift one end of the watercraft, preferably the bow, and place it onto the angled cross member support bar 20. After placement of the bow onto the support bar 20, the user then lifts the other end of the watercraft and pushes the watercraft bottom across the low resistance coating or covering on support bar 20, or in the alternative, across at least one support unit 40 with an upward motion into the cargo bed of the pickup truck. While pushing the watercraft, it is obvious to those skilled in the art that the support bar 20 bears the majority of the weight of the watercraft during this loading process thus making loading and unloading easy for one person.

If the cradle assembly 100 is used, then an alternative to pushing the watercraft into the cargo bed of the pickup truck would be to attach a winch line from winch 122 to the bow of the watercraft. Once attached, winch 122 would be turn causing the watercraft to slide up across trailer hitch support 10 and onto the rails 110 and 110' of cradle assembly 100.

It is obvious to those skilled in the art that any of the embodiments of the present invention would be used in a similar fashion. Of course, the embodiment having the hinged support bar would require adjustment depending on the type of bottom on the watercraft.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A watercraft loading apparatus comprising:
   an elongate member having a first end and a second end, said first end adapted for attaching to a trailer hitch receiver;
   an elongate cross member having a first cross member end and a second cross member end wherein said first cross member end and said second cross member end forms an obtuse angle having a vertex substantially at a midpoint of said elongate cross member, said cross member being transversely connected at said vertex to said second end of said elongate member; and
   at least one support member mounted on said cross member for supporting the bottom of a watercraft.

2. The apparatus as claimed in claim 1 further comprising:
   a cradle assembly having a first end and a second end, said cradle assembly comprising:
   a pair of support rails, said support rails being in a spaced parallel relationship to each other;
   at least one cross brace member connected between said support rails for maintaining said spaced relationship;
   at least one support member mounted on said first end of said cradle assembly;
   an upright post connected to said second end of said cradle assembly; and
   a horizontal transverse abutment for receiving the bow portion of said watercraft.

3. The apparatus as claimed in claim 2 wherein said at least one support member is a roller assembly.

4. The apparatus as claimed in claim 3 wherein said roller assembly comprising a u-shaped support bracket having two extending legs, a support bar fixedly attached to said support bracket between said two extending legs and a roller element rotatably mounted on said support bar.

5. The apparatus as claimed in claim 4 wherein said roller is made of a polymer material.

6. The apparatus as claimed in claim 4 wherein said roller is made of rubber.

7. The apparatus as claimed in claim 2 wherein said cradle assembly further includes a winch mechanism mounted above said horizontal transverse abutment on said upright post.

8. The apparatus as claimed in claim 2 wherein said cradle assembly further includes at least one post brace angularly connected between said upright post and at least one of said support rails.

9. The apparatus as claimed in claim 1 wherein said elongate cross member further comprising:
   a base cross member having a first base cross member end and a second base cross member end;
   a first extension cross member, said first extension cross member being pivotally attached to said base cross member at said first base cross member end; and
   a second extension cross member, said second extension cross member being pivotally attached to said base cross member at said second base cross member end.

10. The apparatus as claimed in claim 9 wherein said base cross member comprising:
    a first base member having a first elongate member end and a first extension cross member end wherein said first elongate member end is connected to said second end of said elongate member and said first extension cross member end is rotatably attached to said first extension cross member; and
    a second base member having a second elongate member end and a second extension cross member end wherein said second elongate member end is connected to said second end of said elongate member and said second extension cross member end is rotatably attached to said second extension cross member.

11. The apparatus as claimed in claim 10 further comprising a first locking mechanism for locking said first extension cross member into substantial alignment with said first base member, and a second locking mechanism for locking said second extension cross member into substantial alignment with said second base member.

12. The apparatus as claimed in claim 10 wherein said first extension cross member and said second extension cross member each have at least one of said support members.

13. The apparatus as claimed in claim 9 further comprising a first locking mechanism for locking said first extension cross member into substantial alignment with said base cross member at said first cross member end, and a second locking mechanism for locking said second extension cross member into substantial alignment with said base cross member at said second cross member end.

14. The apparatus as claimed in claim 9 wherein said first extension cross member and said second extension cross member each have at least one support member fixedly attached thereon.

15. The apparatus as claimed in claim 1 wherein said at least one support member has a roller element.

16. The apparatus as claimed in claim 15 wherein said roller element is made of a polymer.

17. The apparatus as claimed in claim 15 wherein said roller element is made of rubber.

18. The apparatus as claimed in claim 15 wherein said roller element is a roller assembly comprising a u-shaped support bracket having two extending legs, a support bar fixedly attached to said support bracket between said two extending legs and a roller rotatably mounted on said support bar.

19. The apparatus as claimed in claim 1 further comprising a vertical support bar fixedly attached on one end to said second end of said elongate member and on a second end to said midpoint of said elongate cross member.

20. A watercraft loading apparatus kit comprising:
    a receiver member having a first receiver end and a second receiver end, said first receiver end adapted for attaching to a trailer hitch receiver;
    a cross member having a first cross member end and a second cross member end wherein said first cross member end and said second cross member end forms an obtuse angle having a vertex substantially at a midpoint of said cross member, said vertex adapted for transversely connecting said cross member to said second receiver end;
    at least one support member adapted for mounting on said cross member for supporting the bottom of a watercraft; and
    attaching means for securing said cross member to said receiver member.

21. The watercraft loading apparatus kit of claim 20 further comprising a vertical support member adapted for attaching between said second receiver end and said midpoint of said cross member.

22. The watercraft loading apparatus kit of claim 20 wherein said cross member further comprising:
    a base cross member having a first base cross member end and a second base cross member end;
    a first extension cross member, said first extension cross member being pivotally attached to said base cross member at said first base cross member end; and
    a second extension cross member, said second extension cross member being pivotally attached to said base cross member at said second base cross member end.

23. The watercraft loading apparatus kit of claim 22 wherein said base cross member further comprising:
    a first base cross member having a first base cross member end and a first extension cross member end wherein said first base cross member end is adapted for connecting to said second receiver end of said receiver member and said first extension cross member end is rotatably attached to said first extension cross member; and
    a second base member having a second base cross member end and a second extension cross member end wherein said second base cross member end is adapted for connecting to said second receiver end of said receiver member and said second extension cross member end is rotatably attached to said second extension cross member.

* * * * *